Nov. 6, 1928.                                                   1,690,607
O. WITTEL
FOCUSING OBJECTIVE MOUNT FOR CAMERAS
Filed May 5, 1927
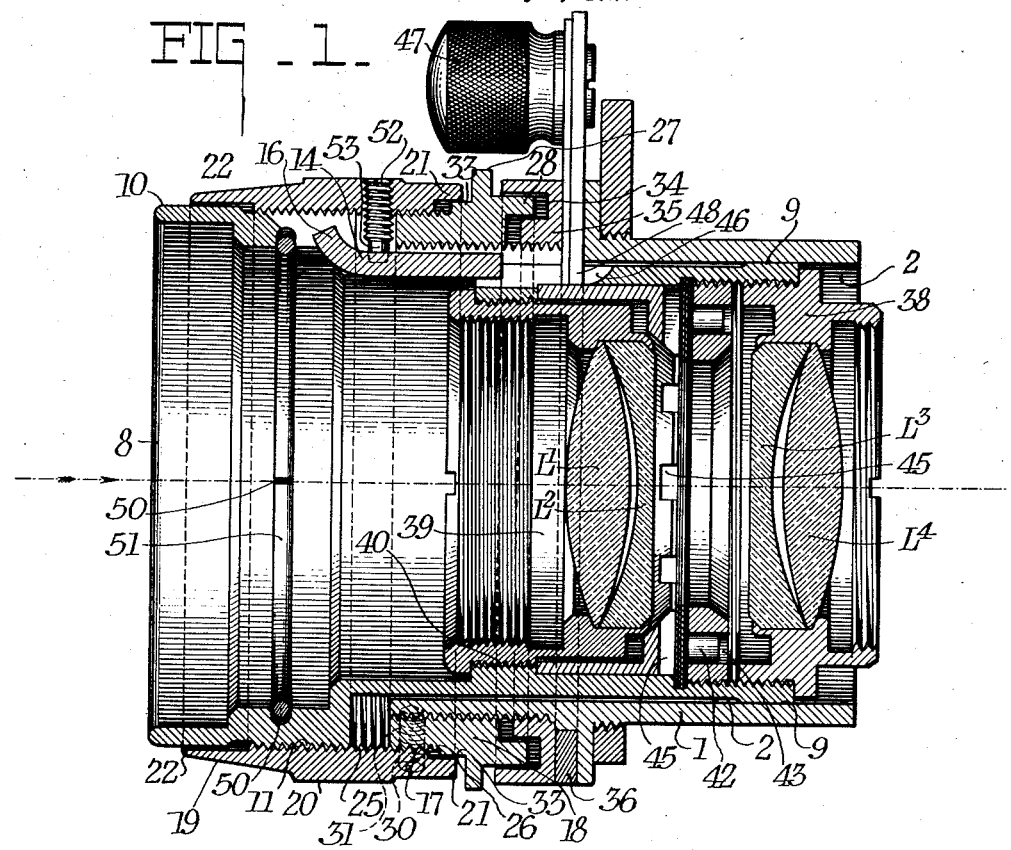
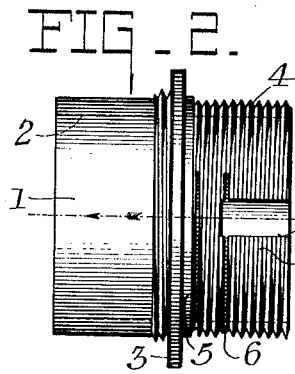
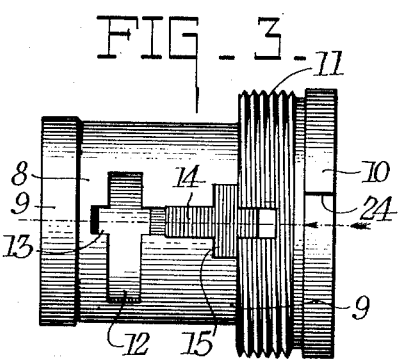
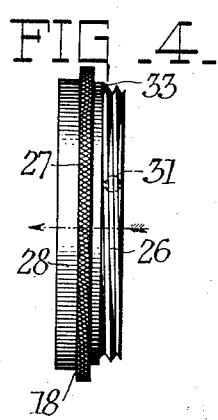
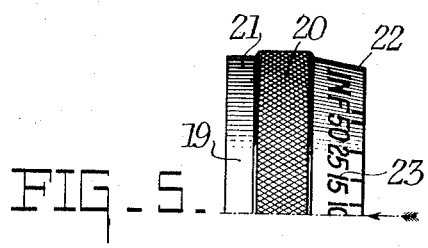
INVENTOR,
Otto Wittel,
BY
ATTORNEYS.

Patented Nov. 6, 1928.

1,690,607

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

FOCUSING OBJECTIVE MOUNT FOR CAMERAS.

Application filed May 5, 1927. Serial No. 189,132.

This invention relates to photography, and more particularly to focusing objective mounts for cameras. One object of my invention is to provide a focusing mount for objectives in which the objective is slidably mounted in a tubular support, and a single focusing ring connecting these parts. Another object is to provide a device of the class described in which the relatively movable parts have interengaging or telescoping parts to prevent dust or dirt from entering the objective or the working parts of the mount. Another object is to provide a focusing mount in which an adjusting ring is movable but in which sufficient tension is provided to hold the ring in a set position, and other objects will appear from the following specification, the novel features being particularly pointed out in the claims at the end thereof.

Coming now to the drawings, wherein like reference characters denote like parts throughout,—

Fig. 1 is a section through the focusing objective and mount constructed in accordance with and illustrating a preferred embodiment of my invention;

Fig. 2 is a side elevation of the support in which the objective mount may slide;

Fig. 3 is a side elevation of the tubular member in which the objective is mounted;

Fig. 4 is a side elevation of one part of the focusing ring, and

Fig. 5 is a side elevation of part of the focusing ring.

My invention consists broadly in providing a tubular support in which an objective is slidably mounted, with a focusing ring for adjusting the objective relative to the mount. The focusing ring is provided with an adjustment by which the objective may be initially adjusted.

As shown in Fig. 2, the support consists of a tubular member 1, having a smooth inside bore 2 and an outwardly extending flange 3, and a threaded area 4. The threaded area 4 is provided with a slot 5, a second slot 6 and a third slot 7, which is angularly disposed with respect to slot 6.

The objective mount may comprise a tubular member 8 having an enlarged end 9 adapted to slide in a smooth bore 2 of the supporting member 1. There is an enlarged flange 10 on one end of member 9 and a thread area 11 adjacent to part 10. It should be noted here that the thread 11 runs in an opposite direction from the thread 4 of part 1. That is, one of these members is provided with a right hand thread while the other is provided with a left hand thread.

The tubular member 9 is slotted circumferentially at 12 and longitudinally at 13, these two slots preferably intersecting as shown in Fig. 3. At one end of slot 13 I provide a flange or web 14, this flange being provided with side extensions 15 at one end. As best shown in Fig. 1, one end 16 of the flange 14 is curved upwardly, thus facilitating placing on an objective attachment, such as a color filter. This is more fully described in my application, optical equipment for cameras, filed May 5, 1927, Serial No. 189,131.

When the objective mount 8 is assembled into the support 1, the flange 9 may be supported by and slide in the bore 2 and the flange 14, by engaging the slot 7, will prevent member 8 from turning in the support.

The focusing ring designated broadly by 17 in Fig. 1, consists of two parts 18 and 19. Part 19 is provided with a knurling 20 and an angularly disposed flange 22. Flange 22 is preferably engraved with a scale graduated into units of distance at 23. The flange 10 of the objective mount 8 bears a locating line 24, so that, by bringing the desired part of the scale opposite line 24, the focal adjustment of the objective will be given.

The greater portion of the inside of part 19 is threaded, as is shown at 25 in Fig. 1. The portion of this threaded area engages with thread 11 of member 9 and another portion of this thread engages with a thread 26 on the second part 18 of the focusing ring. Part 18 of the focusing ring includes a thread 26, a knurling 27 and a flange 28, as shown in Fig. 4. The inner edge of part 18 is threaded at 29 and the direction of the threads 29 is opposite that of threads 25. That is, one thread is right hand and the other thread is left hand.

When an objective is mounted on a camera to obtain the correct initial position of the objective, the ring 17 may be adjusted by turning section 18 relative to section 19 upon the threads 25—26. When the desired position is reached and the objective is properly focused, a set screw 30, which is preferably threaded into the flange 21 is used to fasten the two ring sections together, so that they will move as a single unit. I find it preferable to drill into the thread 26, as is shown at 31, since this holds the parts firmly together.

In order to create the proper tension or friction upon the focusing ring, so that it will remain in any set position, I bend or distort slightly a portion of the threaded area 4. This may easily be done by springing up a portion of the threaded area as at 32, which lies in the intersection of the angularly disposed slots 6 and 7. This section may then be sprung down when it is screwed into the thread 25, and its tendency to press outwardly against the thread will prevent the focusing ring from moving too freely.

In order to present a neat appearance on the outside of the focusing mount, and in order to cover up the threads and prevent dust from getting inside of the mount, I provide a series of overlapping or telescoping flanges, as will now be described.

The two sections 18 and 19 of the focusing ring have telescoping flanges, as best shown in Fig. 1. Ring 18 has a shoulder 33 which is adapted to slide inside of flange 21 on section 19, thus the threaded portions 25 and 26 are covered by it in adjustment of these two members.

The ring 17 has at each end telescoping flanges which cooperate with parts of the support and parts of the focusing mount to form a cover for the threaded parts of these members.

Flange 22 lies over the top of flange 10 of the focusing mount at all adjustments of the ring 17. Flange 28 of ring 18 extends into a groove 34 in the ring 35, which is adapted to hold the diaphragm adjusting ring 36 in position, thus when the focusing ring 17 is moved to and from ring 35, a flange 28 will always be engaged in the groove 34. Aside from making a neater appearance, these inner engaging flanges have the useful function of preventing dust from entering the objective and from becoming engaged between the thread areas of the moving parts.

The objective mount 8 is threaded internally at 37 to receive a lens cell 38 which carries the lens elements $L^3$ and $L^4$. The front lens elements $L^1$ and $L^2$ are carried in a lens cell at 40 with the member 9. The diaphragm may be of any standard construction and is here shown as consisting of a plurality of diaphragm leaves 41, each having a pin 42 engaging a slot 43 in the stationary diaphragm ring 44. The opposite end of each leaf carries a pin (not shown) which enters a slot 45 in the movable ring 46, which may be actuated by the diaphragm ring 36 through the handle 47, this handle having a projection 48 engaging a slot 49 in a movable diaphragm ring. As the objective mount is slid upon the support, the projection 48 slides in the slot 49.

The construction of the diaphragm structure is more fully described in my copending application above referred to.

I also prefer to provide a groove 50 on the inside of member 8, this groove being engaged by a split ring 51 which serves as a snap latch to hold the objective attachment in place, as is fully described in my copending application above referred to.

I prefer to limit the possible movement of the focusing ring 17 to less than 360°, so that threads 25 and 29 may not become accidentally disengaged. To this end I provide a screw 52 which passes down through a portion of ring 17, preferably through the knurling 20. This screw has a foot 53 of such a length that it may strike one side or the other of the flange 14 which guides the objective mount 8 upon the support 1. After the parts have been assembled, screw 52 may be put in place, although the tapped hole may be located before the parts are assembled, since the objective may be preliminarily adjusted by means of the two-part focusing ring.

Having thus described my invention, what I claim as new and desire to secure by Letters Patent is:

1. In a focusing mount for cameras the combination with a support of an objective mount carried thereby, and a ring having a screw thread engagement with the support and also with the mount for moving one relative to the other, said ring including means for initially adjusting an objective relative to the support.

2. In a focusing mount for cameras the combination with a support of an objective mount carried thereby, and a ring having a screw thread engagement with the support and also with the mount for moving one relative to the other, said ring including two relatively adjustable parts adapted to be used for a preliminary adjustment of an objective relative to the mount.

3. In a focusing mount for cameras the combination with a support of an objective mount carried thereby, and a ring having a screw thread engagement with the support and also with the mount for moving one relative to the other, said ring including two telescoping parts adapted to be moved for a preliminary adjustment of an objective.

4. In a focusing mount for cameras the combination with a support of an objective mount carried thereby, and a ring having a screw thread engagement with the support and also with the mount for moving one relative to the other, said ring including means for altering the distance between its threaded portions engaging the support and mount respectively for adjusting an objective relative to the support.

5. In a focusing mount for objectives the combination with a support, an objective mount slidable therein, right and left hand threads on these parts, a ring adapted to connect the mount and support, right and left hand threads on the ring adapted to engage the threads on the mount and support whereby the mount may be slid in the support by the ring.

6. In a focusing mount for objectives the combination with a support, an objective mount slidable therein, right and left hand threads on these parts, a ring adapted to connect the mount and support, right and left hand threads on the ring adapted to engage the threads on the mount and support, and means on the ring for altering the distance between the right and left hand threads, whereby an objective carried by the mount may be moved relative to the support either by turning the ring or by altering the distance between the threads of the ring.

7. In a focusing mount for objectives the combination with a threaded support, of an objective mount movable in the support and having a threaded portion, a two part ring having threads engaging the threads of the mount and support, said threads being right and left handed whereby the mount and support may be relatively moved by rotating the ring, one part of the ring being movably mounted on the other part for a preliminary adjustment of the lens mount relative to the camera.

8. In a focusing mount for objectives the combination with a threaded support, of an objective mount movable in the support and having a threaded portion, a two part ring having threads engaging the threads of the mount and support, said threads being right and left handed whereby the mount and support may be relatively moved by rotating the ring, male and female threads on the ring sections for altering the relative position of the right and left hand threads on the ring.

9. In a focusing mount for cameras, the combination with a support of an objective mount movably mounted thereon, right and left hand threads on the mount and support, a focusing ring having right and left hand threads to cooperate with the above mentioned threads, whereby the relative position of the parts may be altered, and overlapping flanges on the relatively movable parts adapted to cover up the threaded portions.

10. In a focusing mount for cameras, the combination with a support of an objective mount movably mounted thereon, right and left hand threads on the mount and support, a focusing ring having right and left hand threads to cooperate with the above mentioned threads, whereby the relative position of the parts may be altered, flanges projecting beyond the threaded parts of the focusing ring, and flanges projecting from the threaded parts of the mount and support, the flanges of the ring being adapted to at least partially telescope the other flanges.

11. In a focusing mount for cameras, the combination with a support of an objective mount movably mounted thereon, right and left hand threads on the mount and support, a focusing ring having right and left hand threads to cooperate with the above mentioned threads, whereby the relative position of the parts may be altered, annular projections on the ring adapted to telescope parts of the objective mount and support.

12. In a focusing mount for cameras, the combination with a threaded support, of a threaded objective mount movably mounted thereon, a ring having threaded connections with the mount and support and annular flanges on the ring adapted to lie over and protect the threads.

13. In a focusing mount for cameras, the combination with a threaded support, of a threaded objective mount movably mounted thereon, being adapted to move a fixed distance relative thereto, a ring having threaded connections with the support and objective mount, and flanges extending over the threaded connections, said flanges having greater length than the distance the mount may move on the support.

14. In a focusing mount for cameras, the combination with a threaded support, of a threaded objective mount movably mounted thereon, being adapted to move a fixed distance relative thereto, a ring having threaded connections with the support and objective mount, and flanges projecting from the ring adapted to lie over the threaded connections, said flanges being of greater length than the extent of travel of the mount on the support.

15. In a focusing mount for cameras, the combination with a support, a threaded and slotted area on the support, of an objective mount slidably mounted in the support, a web on the mount adapted to engage the slot, a threaded area on the mount, and a focusing ring connecting the two threaded areas for relatively moving the mount and support the former being guided by the latter through the engagement of the web and the slot.

16. In a focusing mount for cameras, the combination with a support, of a threaded portion on the support having a pair of angularly disposed slots therein, an objective mount movably mounted in the support, a thread on the mount, one of the threads being a right and the other thread being a left hand thread, a portion of the thread of the support adjacent the angular disposed slots being sprung from its normal position whereby a tensioning member is produced, a focusing ring having right and left hand threads engaging the threads of the support and mount said ring receiving the thrust of the tensioning member to normally hold the parts in a set position.

17. In a focusing mount for cameras, the combination with a support including a tubular slideway, and an exteriorly threaded portion in which there is a pair of angularly disposed slots, a portion of the threaded member being sprung from its normal position to form a spring arm, of an objective mount having a smooth exterior surface adapted to engage and slide in the tubular slideway, a threaded end adapted to project beyond the end of the guideway, the two threaded members being connected by a focusing nut by which the mount may be moved in the support, said spring arm pressing against a portion of the focusing nut whereby the parts may be spring held in a set position.

18. In a focusing mount for cameras, the combination with a support, having a smooth internal bore forming a slideway and an exterior threaded member, a focusing nut supported by the threaded member, an objective mount having a smooth area forming a bearing for the mount in the support, a threaded area on the mount supported by the nut, whereby the focusing nut both carries one end of the mount and is adapted to also move the mount in its slideway for focusing the objective.

Signed at Rochester, New York, this 29th day of April, 1927.

OTTO WITTEL.